US009838886B2

(12) United States Patent
Cao et al.

(10) Patent No.: US 9,838,886 B2
(45) Date of Patent: Dec. 5, 2017

(54) ACTIVE DISTRIBUTED ANTENNA SYSTEM AND RELAY UNIT THEREOF

(71) Applicant: Comba Telecom Technology (Guangzhou) Co., Ltd., Guangdong (CN)

(72) Inventors: Song Cao, Guangzhou (CN); Hailong Deng, Guangzhou (CN); Hui Zhang, Guangzhou (CN); Yuwen Zhang, Guangzhou (CN)

(73) Assignee: Comba Telecom Technology (Guangzhou) Co., Ltd., Guangdong (CN)

( * ) Notice: Subject to any disclaimer, the term of this patent is extended or adjusted under 35 U.S.C. 154(b) by 0 days.

(21) Appl. No.: 15/119,111

(22) PCT Filed: Oct. 23, 2015

(86) PCT No.: PCT/CN2015/092694
§ 371 (c)(1),
(2) Date: Aug. 15, 2016

(87) PCT Pub. No.: WO2016/155295
PCT Pub. Date: Oct. 6, 2016

(65) Prior Publication Data
US 2017/0048724 A1    Feb. 16, 2017

(30) Foreign Application Priority Data

Mar. 31, 2015   (CN) .................... 2015 2 0193141 U

(51) Int. Cl.
*H04W 40/00* (2009.01)
*H04W 16/26* (2009.01)
(Continued)

(52) U.S. Cl.
CPC .............. *H04W 16/26* (2013.01); *H04B 7/04* (2013.01); *H04B 7/155* (2013.01); *H04B 7/15507* (2013.01); *H04W 40/00* (2013.01)

(58) Field of Classification Search
CPC ........ H04W 16/26; H04W 40/00; H04B 7/04; H04B 7/155; H04B 7/15507
(Continued)

(56) References Cited

U.S. PATENT DOCUMENTS 8,010,160 B2 *   8/2011  Splett .................... H01Q 1/246
                                                            343/858
2001/0046840 A1 * 11/2001  Kim ..................... H04B 7/2606
                                                              455/7

(Continued)

FOREIGN PATENT DOCUMENTS

CN         102362448 A      2/2012
CN         202737876 U      2/2013
CN         204559569 U      8/2015

OTHER PUBLICATIONS

International Search Report for PCT Application No. PCT/CN2015/092694 dated Jan. 18, 2016, 2 pages.

*Primary Examiner* — Mong-Thuy Tran
(74) *Attorney, Agent, or Firm* — Seyfarth Shaw LLP

(57) ABSTRACT

An active distributed antenna system and a relay unit thereof are disclosed. The relay unit includes: at least two access units, first combiners and optical units; a number of first radio frequency switches, second radio frequency switches and second power dividers corresponding to the first combiners respectively; a second combiner and a first power divider; wherein each of the first combiners is coupled at one end to at least one of the access units, and the other end is coupled to the movable terminal of the first radio frequency switch; one end of the second combiner is coupled to the first stationary terminal of each of the first radio frequency
(Continued)

switches respectively, and the other end is couple to the first power divider; the other end of the first power divider is coupled to the first stationary terminal of each of the second radio frequency switches respectively; the second stationary terminal of each second radio frequency switch is coupled to the second stationary terminal of a corresponding first radio frequency switch, and the movable terminal of each second radio frequency switch is coupled to one second power divider; and the other end of each second power divider is coupled to at least one optical unit. The SISO mode and the MIMO mode are compatible in the relay unit according to the present invention, so the network construction is at a low cost.

8 Claims, 5 Drawing Sheets

(51) Int. Cl.
  *H04B 7/04* (2017.01)
  *H04B 7/155* (2006.01)

(58) Field of Classification Search
  USPC .................................................. 455/446, 101
  See application file for complete search history.

(56) References Cited

U.S. PATENT DOCUMENTS

| | | |
|---|---|---|
| 2011/0292863 A1 | 12/2011 | Braz et al. |
| 2012/0027054 A1 | 2/2012 | Palanki et al. |
| 2015/0381243 A1* | 12/2015 | Park .................. H04B 7/04 370/338 |
| 2016/0218793 A1* | 7/2016 | Han .................. H04B 7/155 |
| 2017/0048724 A1 | 2/2017 | Cao et al. |
| 2017/0195108 A1* | 7/2017 | Liu .................. H04L 5/1461 |

* cited by examiner

ACTIVE DISTRIBUTED ANTENNA SYSTEM AND RELAY UNIT THEREOF

CROSS REFERENCE TO RELATED APPLICATIONS

This is a National Stage application of PCT/CN2015/092694, filed Oct. 23, 2015, and further claims priority to Chinese patent application serial no. CN 201520193141.X, filed Mar. 31, 2015, the disclosures of which are incorporated herein by reference.

FIELD

The present disclosure relates generally to the field of mobile communication, and more particularly, to an active distributed antenna system and a relay unit of the active distributed antenna system.

BACKGROUND

With the rapid development of network construction and customer application requirements of the mobile communication, the coverage and quality requirements of indoor signals are increasingly growing stronger. The active indoor Distributed Antenna System (DAS) has gradually become a preferable scheme for achieving high quality indoor in-depth coverage. There are coverage schemes of SISO (Single Input Single Output) and MIMO (Multi-input Multi-output) in the deployment of 4G LTE (as a general term for TD-LTE, FDD-LTE and other LTE network types) networks. The SISO coverage may be performed firstly in some places, and then the MIMO coverage may be performed. However, the existing DAS relay unit only supports one of SISO mode and MIMO mode, and is not configurable. Different DAS relay units are applied according to different schemes during the 4G (the fourth generation of mobile communication technology) network construction, and in this regard when SISO needs to be upgraded to MIMO, devices have to be replaced, which greatly increases the cost of the network construction.

SUMMARY

Based on the above, it is necessary to provide an active distributed antenna system and a relay unit thereof, which can be configured to be in a MIMO mode and a SISO mode, so as to achieve the improvement of the flexibility of the network construction and reduce the cost of the network coverage upgrade.

A relay unit of an active distributed antenna system is provided, including at least two access units, at least two first combiners, a number of first radio frequency switches corresponding to the first combiners, a second combiner, a first power divider, a number of second radio frequency switches corresponding to the first combiners, a number of second power dividers corresponding to the first combiners, and at least two optical units; and wherein each of the first combiners is coupled at one end to at least one of the access units, and is coupled at the other end to the movable terminal of one of the first radio frequency switches; the second combiner is coupled at one end to the first stationary terminal of each of the first radio frequency switches respectively, and is couple at the other end to one end of the first power divider; the first power divider is coupled at the other end to the first stationary terminal of each of the second radio frequency switches respectively; each of the second radio frequency switches is coupled at the second stationary terminal to the second stationary terminal of a corresponding one of the first radio frequency switches respectively, and each of the second radio frequency switches is coupled at the movable terminal to one end of one of the second power dividers respectively; and each of the second power dividers is coupled at the other end to at least one of the optical units.

An active distributed antenna system is also provided, including a relay unit and at least two remote units, wherein the relay unit including at least two access units, at least two first combiners, a number of first radio frequency switches corresponding to the first combiners, a second combiner, a first power divider, a number of second radio frequency switches corresponding to the first combiners, a number of second power dividers corresponding to the first combiners, and at least two optical units;

each of the first combiners is coupled at one end to at least one of the access units, and is coupled at the other end to the movable terminal of one of the first radio frequency switches; the second combiner is coupled at one end to the first stationary terminal of each of the first radio frequency switches respectively, and is couple at the other end to one end of the first power divider; the first power divider is coupled at the other end to the first stationary terminal of each of the second radio frequency switches respectively; each of the second radio frequency switches is coupled at the second stationary terminal to the second stationary terminal of a corresponding one of the first radio frequency switches respectively, and each of the second radio frequency switches is coupled at the movable terminal to one end of one of the second power dividers respectively; each of the second power dividers is coupled at the other end to at least one of the optical units; and the remote unit is coupled to the optical unit, and the second power divider accessed by at least one remote unit of the remote units via the optical unit is different from the other second power divider accessed by other remote units via the optical units.

The active distributed antenna system according to the present disclosure and the relay unit thereof can achieve the configurability between the MIMO mode and the SISO mode by arranging combiners, dividers and frequency switches in the relay unit. In accordance with the present disclosure, the coverage scheme of SISO and the coverage scheme of MIMO can use a same relay unit, which greatly improves the flexibility of the network construction, and in the network upgrade, it is only necessary to reconfigure the relay unit without replacing the device, so as to greatly reduce the cost of the network construction.

DETAILED DESCRIPTION OF THE PREFERRED EMBODIMENTS

Purposes, technical solutions, and achieved technical effects according to the present disclosure may be best understood by reference to the following description of the preferred embodiments taken in conjunction with the accompanying drawings. It should be noted that the terms "first" and "second" may be used herein to distinguish the same type of components, the number and sequence of these components should not be limited by these terms, unless the context indicates otherwise.

Figure 1:
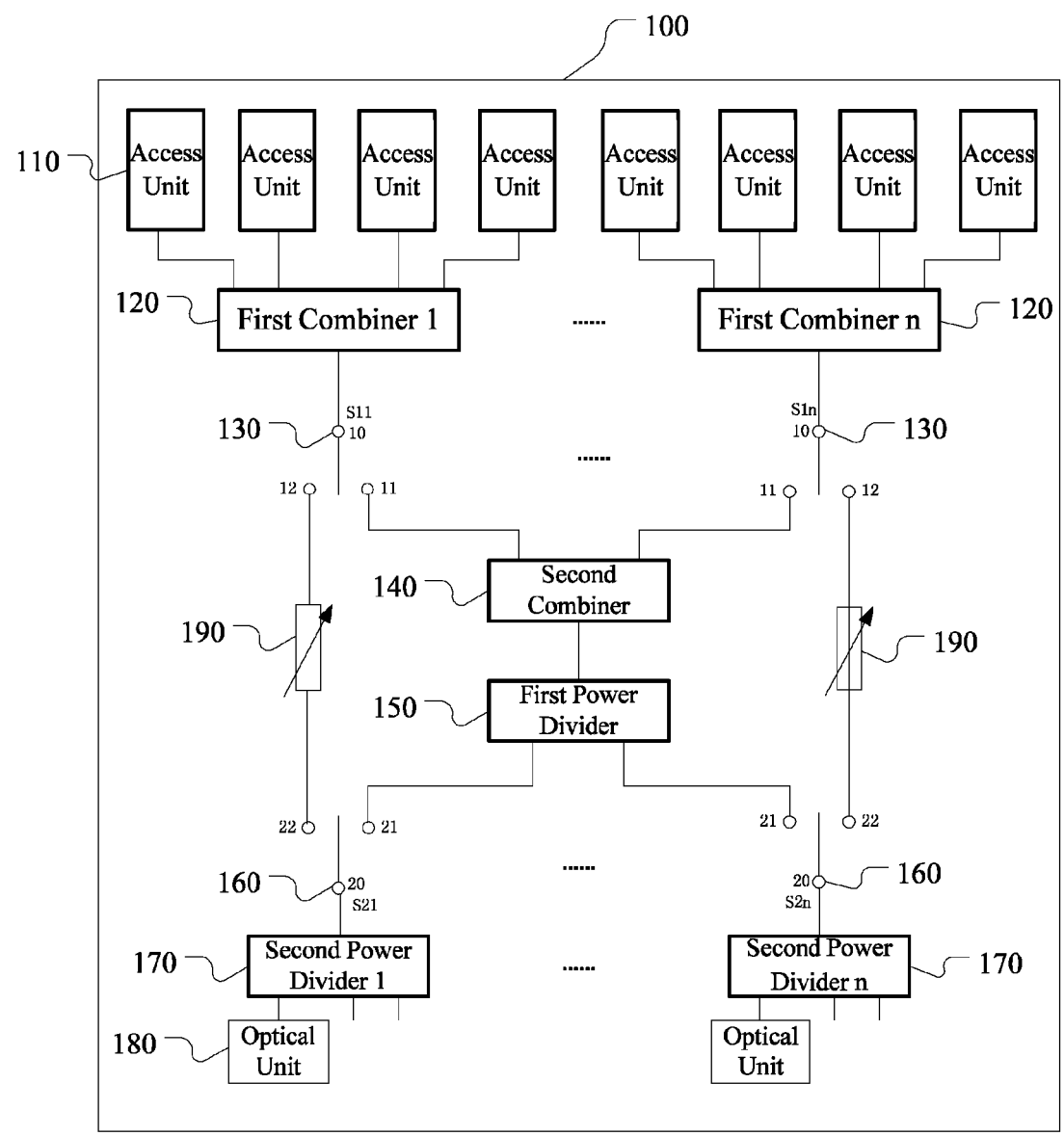
FIG. 1 is a schematic diagram illustrating a relay unit of an active distributed antenna system according to one embodiment of the present disclosure.

As shown in FIG. 1, a relay unit of an active distributed antenna system is provided, including at least two access units 110, at least two first combiners 120, a number of first radio frequency switches 130 corresponding to the first combiners 120, a second combiner 140, a first power divider 150, a number of second radio frequency switches 160 corresponding to the first combiners 120, a number of second power dividers 170 corresponding to the first combiners 120, and at least two optical units 180.

Each of the first combiners 120 is coupled at one end to at least one of the access units 110, and is coupled at the other end to the movable terminal (Terminal 10) of one of the first radio frequency switches 130; the second combiner 140 is coupled at one end to the first stationary terminal (Terminal 11) of each of the first radio frequency switches 130, and is couple at the other end to one end of the first power divider 150; the first power divider 150 is coupled at the other end to the first stationary terminal (Terminal 21) of each of the second radio frequency switches 160; each of the second radio frequency switches 160 is coupled respectively at the second stationary terminal (Terminal 22) to the second stationary terminal (Terminal 12) of a corresponding one of the first radio frequency switches 130, and each of the second radio frequency switches 160 is coupled respectively at the movable terminal (Terminal 20) to one end of one of the second power dividers 170; and each of the second power dividers 170 is coupled at the other end to at least one of the optical units 180.

As shown in FIG. 1, the relay unit 100 according to the present disclosure further includes an attenuator 190 which is coupled between the second stationary terminal (Terminal 12) of a corresponding one of the first radio frequency switches 130 and the second stationary terminal (Terminal 22) of a corresponding one of the second radio frequency switches 160. Each terminal at one end of each of the first combiners 120 is couple to an access unit 110, that is, the number of branches on one end of each of the first combiners 120 corresponds to the number of the access units 110 accessed. Each terminal at one end of each of the second power dividers 170 is coupled to an optical unit 180, that is, the number of branches on one end of each of the second power dividers 170 corresponds to the number of the optical units 180 accessed.

Processes of the relay unit 100 according to the present disclosure operating in the MIMO mode and the SISO mode are described in detail below in conjunction with FIG. 1.

Assume there are n frequency bands of radio communication accessed to the relay unit 100, as signal sources.

When the movable terminal (Terminal 10) of each of the first radio frequency switches 130 is coupled to the first stationary terminal (Terminal 11) of each of the first radio frequency switches 130, and the movable terminal (Terminal 20) of each of the second radio frequency switches 160 is coupled to the first stationary terminal (Terminal 21) of each of the second radio frequency switch 160, that is, each of the switches S11, ..., and S1n is switched to the position "11", and each of the switches S21, ..., S2n is switched to the position "21", taking the first combiner 1 as an example, the input signal of a frequency band may pass the access unit 110, the first combiner 1, the switch S11, the second combiner 140 and the first power divider 150 sequentially, enter into the switch S21, S22, ..., and S2n respectively, and pass through the second power divider 1, the second power divider 2, ..., and the second power divider n respectively into the coupled respective optical unit 180. The processes of signals of frequency bands input into another first combiner n are similar. At this time, each optical unit 180 can receive signals of n frequency bands, and the relay unit 100 operates in the SISO mode.

When the movable terminal (Terminal 10) of each of the first radio frequency switches 130 is coupled to the second stationary terminal (Terminal 12) of each of the first radio frequency switches 130, and the movable terminal (Terminal 20) of each of the second radio frequency switches 160 is coupled to the second stationary terminal (Terminal 22) of each of the second radio frequency switch 160, that is, each of the switches S11, ..., and S1n is switched to the position "12", and each of the switches S21, S2n is switched to the position "22", taking the first combiner 1 as an example, the input signal of a frequency band may pass the access unit 110, the first combiner 1, the switch S11, the attenuator 190, the switch S21, and the second power divider 1 into the optical unit 180 coupled to the second power divider 1. Similarly, the signal of a frequency band input into the first combiner n may enter into the optical unit 180 coupled to the second power divider n, that is, each optical unit 180 may only receive a signal of a frequency band correspondingly input, and the relay unit 100 operates in the MIMO mode.

It should be noted that the above description only explains the implementation process of the signal of the frequency band input into the access unit, but the implementation process of the signal from the remote unit input into the optical unit is the same as that of the above description, and not explained here.

The relay unit according to the present invention can achieve the configuration of the signal path, that is, achieve the SISO coverage and MIMO coverage, by configuring the radio frequency switches, so the flexibility of the network construction is greatly improved. In this way, when the network is upgraded, only the reconfiguration of the relay unit is required, without replacing devices, and it greatly reduces the cost of the network construction.

The specific implementation way of relay unit according to the present disclosure may be best understood by reference to the following details of two exemplary embodiments.

Example One

Figure 2:
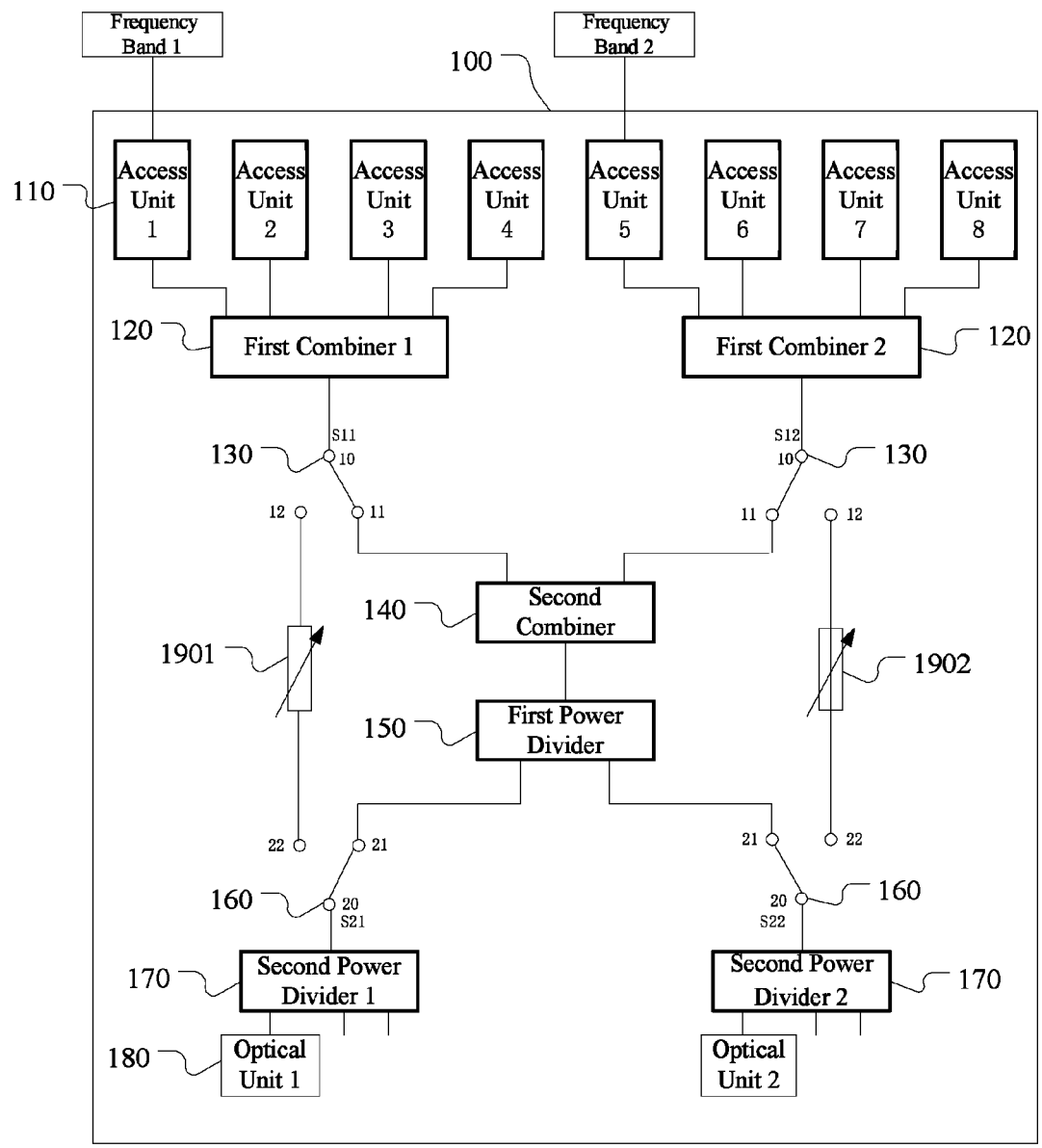
FIG. 2 is a schematic diagram illustrating a relay unit with two branches which operates in a SISO mode according to a certain embodiment of the present disclosure.

As shown in FIG. 2, it is a schematic diagram illustrating a relay unit with two branches which operates in the SISO mode. Two frequency bands (frequency band 1 and frequency band 2) of radio communication access the relay unit 100, as signal sources. Each of the switches S11 and S12 is switched to the position "11", and each of the switches S21 and S22 is switched to the position "21". The signal of the frequency band 1 may pass the access unit 1, the first combiner 1, the switch S11, the second combiner 140 and the first power divider 150, enter into the switches S21 and S22 respectively, and pass through the second power divider 1 and the second power divider 2 respectively into the optical unit 1 and the optical unit 2. Similarly, the signal of the frequency band 2 may pass the access unit 5, the first combiner 2, the switch S12, the second combiner 140 and the first power divider 150, enter into the switches S21 and S22 respectively, and pass through the second power divider 1 and the second power divider 2 respectively into the optical unit 1 and the optical unit 2. At this time, each of the optical unit 1 and the optical unit 2 can receive the signal of the frequency band 1 and the signal of frequency band 2, and the relay unit 100 operates in the SISO mode.

Figure 3:
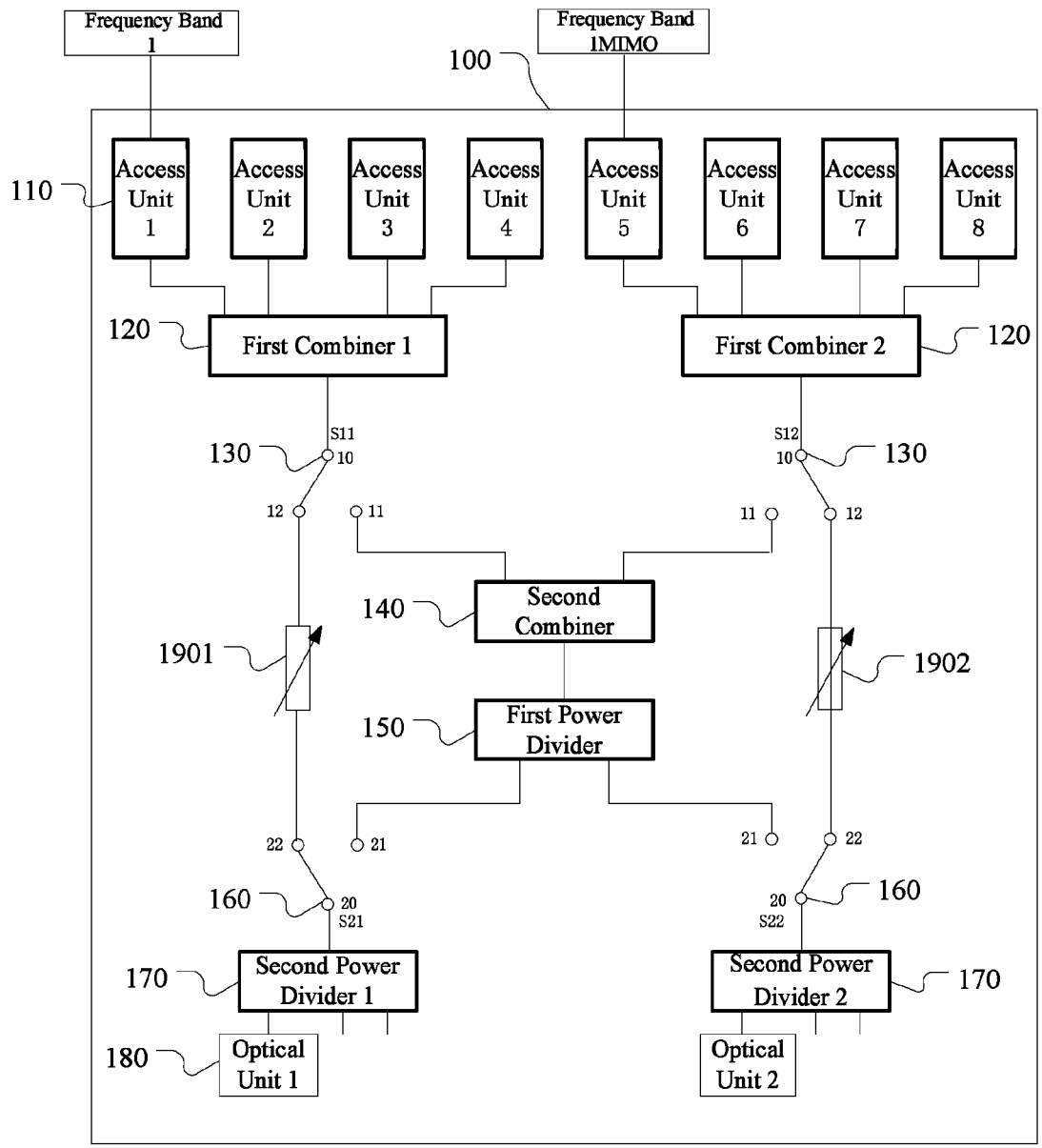
FIG. 3 is a schematic diagram illustrating a relay unit with two branches which operates in MIMO mode according to a certain embodiment of the present disclosure.

As shown in FIG. 3, it is a schematic diagram illustrating a relay unit with two branches which operates in the MIMO mode. Two frequency bands (frequency band 1 and frequency band 1MIMO) of radio communication access the relay unit 100, as signal sources. Each of the switches S11 and S12 is switched to the position "12", and each of the switches S21 and S22 is switched to the position "22". The signal of the frequency band 1 may pass the access unit 1, the first combiner 1, the switch S11, the attenuator 1901, the switch S21 and the second power divider 1 and enter into the optical unit 1. Similarly, the signal of the frequency band 1MIMO may pass the access unit 5, the first combiner 2, the switch S12, the attenuator 1902, the switch S22 and the second power divider 2 and enter into the optical unit 2. At this time, the optical unit 1 may only receive signal of frequency band 1, the optical unit 2 may only receive signal of frequency band 1MIMO, and the relay unit 100 operates in the MIMO mode.

Example Two

Figure 4:
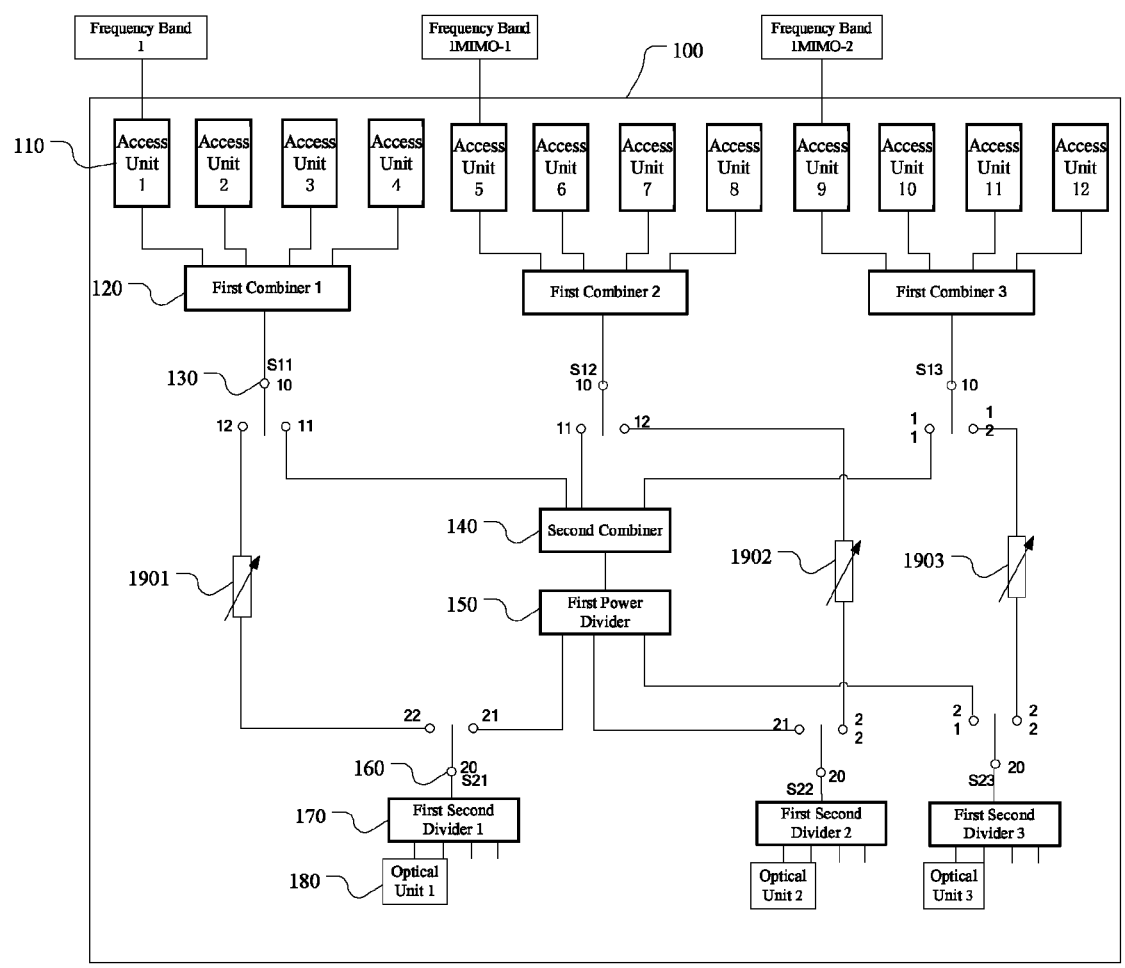
FIG. 4 is a schematic diagram illustrating a relay unit with three branches according to a certain embodiment of the present disclosure.

As shown in FIG. 4, it is a schematic diagram illustrating a relay unit with three branches. Three frequency bands (frequency band 1, frequency band 1MIMO-1 and frequency band 1MIMO-2) of radio communication access the relay unit 100, as signal sources.

When each of the switches S11, S12 and S13 is switched to the position "11", and each of the switches S21, S22 and S23 is switched to the position "21", the signal of the frequency band 1 may pass the access unit 1, the first combiner 1, the switch S11, the second combiner 140 and the first power divider 150, enter into the switches S21, S22 and S23 respectively, and pass through the second power divider 1, the second power divider 2 and the third power divider 3 respectively into the optical unit 1, the optical unit 2 and the optical unit 3. The signal of the frequency band 1MIMO-1 may pass the access unit 5, the first combiner 2, the switch S12, the second combiner 140 and the first power divider 150, enter into the switches S21, S22 and S23 respectively, and pass through the second power divider 1, the second power divider 2 and the second power divider 3 respectively into the optical unit 1, the optical unit 2 and the optical unit 3. The signal of the frequency band 1MIMO-2 may pass the access unit 9, the first combiner 3, the switch S13, the second combiner 140 and the first power divider 150, enter into the switches S21, S22 and S23 respectively, and pass through the second power divider 1, the second power divider 2 and the second power divider 3 respectively into the optical unit 1, the optical unit 2 and the optical unit 3. At this time, each of the optical unit 1, the optical unit 2 and the optical unit 3 can receive the signals of the frequency band 1, the frequency band 1MIMO-1 and the frequency band 1MIMO-2, and the relay unit 100 operates in the SISO mode.

When each of the switches S11, S12 and S13 is switched to the position "12", and each of the switches S21, S22 and S23 is switched to the position "22", the signal of the frequency band 1 may pass the access unit 1, the first combiner 1, the switch S11, the attenuator 1901, the switch S21 and the second power divider 1 and enter into the optical unit 1. The signal of the frequency band 1MIMO-1 may pass the access unit 5, the first combiner 2, the switch S12, the attenuator 1902, the switch S22 and the second power divider 2 and enter into the optical unit 2. The signal of the frequency band 1MIMO-2 may pass the access unit 9, the first combiner 3, the switch S13, the attenuator 1903, the switch S23 and the second power divider 3 and enter into the optical unit 3. At this time, the optical unit 1 may only receive signal of frequency band 1, the optical unit 2 may only receive signal of frequency band 1MIMO-1, the optical unit 3 may only receive signal of frequency band 1MIMO-2, and the relay unit 100 operates in the MIMO mode.

Based on the same inventive concept, an active distributed antenna system is also provided. The exemplary embodiments of the active distributed antenna system according to the present disclosure will be described in detail below.

Figure 5:
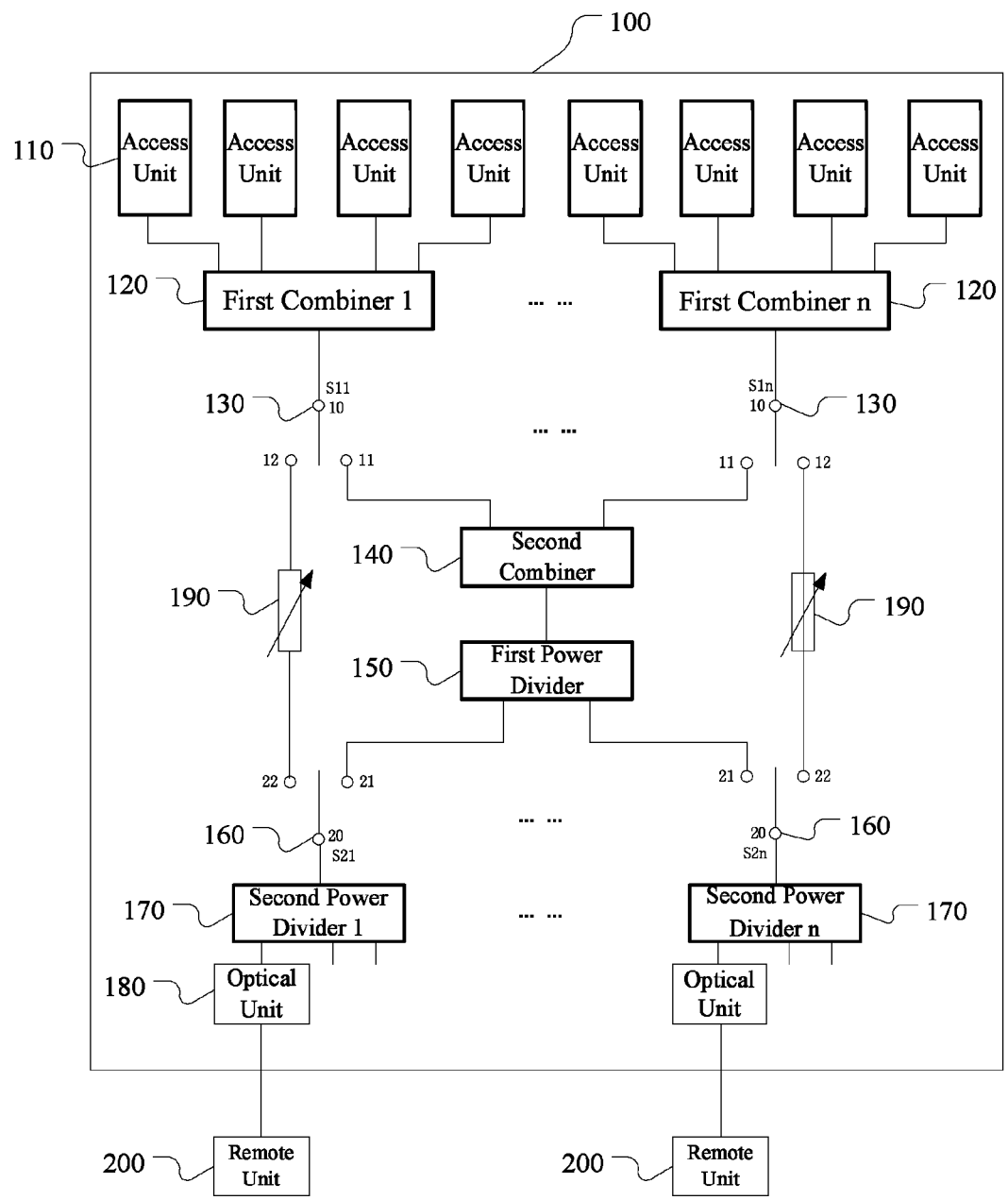
FIG. 5 is a schematic diagram illustrating an active distributed antenna system according to a certain embodiment of the present disclosure.

As shown in FIG. 5, an active distributed antenna system is also provided, including a relay unit 100 and at least two remote units 200. The relay unit 100 includes at least two access units 110, at least two first combiners 120, a number of first radio frequency switches 130 corresponding to the first combiners 120, a second combiner 140, a first power divider 150, a number of second radio frequency switches 160 corresponding to the first combiners 120, a number of second power dividers 170 corresponding to the first combiners 120, and at least two optical units 180.

Each of the first combiners 120 is coupled at one end to at least one of the access units 110, and is coupled at the other end to the movable terminal (Terminal 10) of one of the first radio frequency switches 130; the second combiner 140 is coupled at one end to the first stationary terminal (Terminal 11) of each of the first radio frequency switches 130, and is couple at the other end to one end of the first power divider 150; the first power divider 150 is coupled at the other end to the first stationary terminal (Terminal 21) of each of the second radio frequency switches 160; each of the second radio frequency switches 160 is coupled at the second stationary terminal (Terminal 22) to the second stationary terminal (Terminal 12) of a corresponding one of the first radio frequency switches 130, and each of the second radio frequency switches 160 is coupled at the movable terminal (Terminal 20) to one end of one of the second power dividers 170; and each of the second power dividers 170 is coupled at the other end to at least one of the optical units 180. The remote unit 200 is coupled to the optical unit 180, and one of the second power dividers 170 accessed by at least one remote unit of the remote units 200 via the optical unit 180 is different from the other second power dividers 170 accessed by other remote units via the optical units 180.

As shown in FIG. 5, the relay unit 100 in the active distributed antenna system according to the present disclosure further includes an attenuator 190 which is coupled between the second stationary terminal (Terminal 12) of a corresponding one of the first radio frequency switches 130 and a second stationary terminal (Terminal 22) of a corresponding one of the second radio frequency switches 160. Each terminal at one end of each of the first combiners 120 is couple to an access unit 110, that is, the number of branches on one end of each of the first combiners 120 corresponds to the number of the access units 110 accessed. Each terminal at one end of each of the second power dividers 170 is coupled to an optical unit 180, that is, the number of branches on one end of each of the second power dividers 170 corresponds to the number of the optical units 180 accessed.

As shown in FIG. 5, assume there are n frequency bands of radio communication accessed to the relay unit 100, as signal sources.

When the movable terminal (Terminal 10) of each of the first radio frequency switches 130 is coupled to the first stationary terminal (Terminal 11) of each of the first radio frequency switches 130, and the movable terminal (Terminal 20) of each of the second radio frequency switches 160 is coupled to the first stationary terminal (Terminal 21) of each of the second radio frequency switch 160, that is, each of the switches S11, . . . , and S1n is switched to the position "11", and each of the switches S21, . . . , S2n is switched to the position "21", taking the first combiner 1 as an example, the input signal of a frequency band may pass the access unit 110, the first combiner 1, the switch S11, the second combiner 140 and the first power divider 150 sequentially, enter into the switch S21, S22, . . . , and S2n respectively, and pass through the second power divider 1, the second power divider 2, . . . , and the second power divider n respectively into the coupled respective optical unit 180. The processes of signals of frequency bands input into another first combiner n are similar. At this time, each of the RUs (remote units) coupled to the respective optical unit 180 through a optical fiber can receive signals of n frequency bands, and the relay unit 100 operates in the SISO mode.

When the movable terminal (Terminal 10) of each of the first radio frequency switches 130 is coupled to the second stationary terminal (Terminal 12) of each of the first radio frequency switches 130, and the movable terminal (Terminal 20) of each of the second radio frequency switches 160 is coupled to the second stationary terminal (Terminal 22) of each of the second radio frequency switch 160, that is, each of the switches S11, . . . , and S1n is switched to the position "12", and each of the switches S21, . . . , S2n is switched to the position "22", taking the first combiner 1 as an example, the input signal of a frequency band may pass the access unit 110, the first combiner 1, the switch S11, the attenuator 190, the switch S21, and the second power divider 1 into the optical unit 180 coupled to the second power divider 1. Similarly, the signal of a frequency band input into the first combiner n may enter into the optical unit 180 coupled to the second power divider n, that is, the RU couple to the corresponding optical unit 180 through a optical fiber may only receive a signal of a frequency band correspondingly input, and the relay unit 100 operates in the MIMO mode.

The above description only explains the implementation process of the signal of the frequency band input into the access unit, but the implementation process of the signal from the remote unit input into the optical unit is the same as that of the above description, and not explained here.

The SISO mode and the MIMO mode are compatible in the active distributed antenna system according to the present disclosure and the relay unit thereof, which greatly improves the flexibility of the network construction, and the network upgrade just needs the relay unit to be reconfigured, without replacing the device, to greatly reduce the cost of the network construction.

The above are embodiments of the disclosure described in detail, and should not be deemed as limitations to the scope of the present disclosure. It should be noted that variations and improvements will become apparent to those skilled in the art to which the present disclosure pertains without departing from its spirit and scope. Therefore, the scope of the present disclosure is defined by the appended claims.

The invention claimed is:

1. A relay unit of an active distributed antenna system including access units and optical units, comprising:
   at least two first combiners respectively coupled to at least one of the access units;
   a first radio frequency switches respectively having first movable terminals, first stationary terminals, and second stationary terminals, the first movable terminals respectively coupled to the first combiners;
   a second combiner coupled to the first stationary terminals of each of the first radio frequency switches;
   a first power divider coupled to the second combiner;
   a second radio frequency switches respectively having second movable terminals, first stationary terminals, and second stationary terminals, each of the first stationary terminals of the second radio frequency switches coupled to the first power divider, the second stationary terminals of the second radio frequency switches respectively coupled to the second stationary terminals of the first radio frequency switches; and
   second power dividers respectively corresponding to the first combiners, the second power dividers respectively coupled to the second movable terminals and respectively coupled to at least one of the optical units.

2. The relay unit according to claim 1, further comprising:
   an attenuator coupled between the second stationary terminal of a corresponding one of the first radio frequency switches and the second stationary terminal of a corresponding one of the second radio frequency switches.

3. The relay unit according to claim 1, wherein the first movable terminal of each of the first radio frequency switches is respectively coupled to a corresponding one of the first stationary terminals of the first radio frequency switches, and the second movable terminal of each of the second radio frequency switches is respectively coupled to a corresponding one of the first stationary terminals of the second radio frequency switches, and the relay unit operates in a Single Input Single Output (SISO) mode.

4. The relay unit according to claim 1, wherein the movable terminal of each of the first radio frequency switches is respectively coupled to a corresponding one of the second stationary terminals of the first radio frequency switches, and the second movable terminal of each of the second radio frequency switches is respectively coupled to a corresponding one of the second stationary terminals of the second radio frequency switches, and the relay unit operates in a Multi-input Multi-output (MIMO) mode.

5. An active distributed antenna system, comprising:
   a relay unit including:
      access units;
      first combiners respectively coupled to at least one of the access units;
      first radio frequency switches respectively having first movable terminals, first stationary terminals, and second stationary terminals, the first movable terminals respectively coupled to the first combiners;
      a second combiner coupled to the first stationary terminals of each of the first radio frequency switches;
      a first power divider coupled to the second combiner;
      second radio frequency switches respectively having second movable terminals, first stationary terminals, and second stationary terminals, each of the first stationary terminals of the second radio frequency switches coupled to the first power divider, the second stationary terminals of the second radio frequency switches respectively coupled to the second stationary terminals of the first radio frequency switches;

second power dividers respectively corresponding to the first combiners and respectively coupled to the second movable terminals; and optical units respectively coupled to the second power dividers; and remote units respectively coupled to the optical units, and the remove units respectively adapted to access a corresponding one of the second power dividers via the corresponding optical unit.

6. The active distributed antenna system according to claim 5, wherein the relay unit further comprises an attenuator coupled between the second stationary terminal of a corresponding one of the first radio frequency switches and the second stationary terminal of a corresponding one of the second radio frequency switches.

7. The active distributed antenna system according to claim 5, wherein the first movable terminal of each of the first radio frequency switches is respectively coupled to a corresponding one of the first stationary terminals of the first radio frequency switches, and the second movable terminal of each of the second radio frequency switches is respectively coupled to a corresponding one of the first stationary terminals of the second radio frequency switches, and the relay unit operates in a Single Input Single Output (SISO) mode.

8. The active distributed antenna system according to claim 5, wherein the movable terminal of each of the first radio frequency switches is respectively coupled to a corresponding one of the second stationary terminals of the first radio frequency switches, and the second movable terminal of each of the second radio frequency switches is respectively coupled to a corresponding one of the second stationary terminals of the second radio frequency switches, and the relay unit operates in a Multi-input Multi-output (MIMO) mode.

* * * * *